United States Patent
Zutis et al.

(10) Patent No.: US 7,004,113 B1
(45) Date of Patent: Feb. 28, 2006

(54) ANIMAL TRAINING HARNESS

(76) Inventors: Cerena W. Zutis, 1773 Lake St., San Mateo, CA (US) 94403; Diana L. Gerba, 16461 S. Kennedy Dr., Los Gatos, CA (US) 95030

( * ) Notice: Subject to any disclaimer, the term of this patent is extended or adjusted under 35 U.S.C. 154(b) by 0 days.

(21) Appl. No.: 10/993,615

(22) Filed: Nov. 19, 2004

Related U.S. Application Data

(60) Provisional application No. 60/523,757, filed on Nov. 20, 2003.

(51) Int. Cl.
  *A01K 15/02* (2006.01)
(52) U.S. Cl. .................... 119/792; 119/818
(58) Field of Classification Search ............ 119/792, 119/856, 793, 797, 798, 795, 864, 865, 818; 54/71
  See application file for complete search history.

(56) References Cited

U.S. PATENT DOCUMENTS

| | | | |
|---|---|---|---|
| 2,187,021 A | 1/1940 | Everson | 119/96 |
| 2,605,744 A | 8/1952 | Urbanski | 119/96 |
| 3,769,939 A | 11/1973 | Wais et al. | 119/106 |
| 4,964,369 A | 10/1990 | Sporn | 119/96 |
| 5,325,819 A | 7/1994 | Krauss | 119/792 |
| 5,329,885 A | 7/1994 | Sporn | 119/864 |
| 5,335,627 A | 8/1994 | Bandimere | 119/856 |
| 5,359,964 A | 11/1994 | Sporn | 119/864 |
| 5,370,083 A | 12/1994 | Sporn | 119/864 |
| 5,383,426 A | 1/1995 | Krauss | 119/793 |
| 5,471,953 A | 12/1995 | Sporn | 119/792 |
| 5,503,113 A | 4/1996 | Knight | 119/856 |
| 5,511,515 A | 4/1996 | Brown et al. | 119/771 |
| 5,611,298 A | 3/1997 | Sporn | 119/792 |
| 5,676,093 A | 10/1997 | Sporn | 119/792 |
| 5,682,840 A | 11/1997 | McFarland | 119/856 |
| 5,743,216 A * | 4/1998 | Holt, Jr. | 119/793 |
| 5,893,339 A * | 4/1999 | Liu | 119/792 |
| 6,085,694 A * | 7/2000 | Simon | 119/792 |
| 6,401,666 B1 * | 6/2002 | Kircher | 119/792 |

* cited by examiner

*Primary Examiner*—Yvonne R. Abbott
(74) *Attorney, Agent, or Firm*—Schneck & Schneck; Thomas Schneck; David M. Schneck

(57) ABSTRACT

A dog harness including a non-sliding neck and body strap joined at location on the back of the dog when worn by a dog. A slider is also affixed at this location. A stop strap extends through the slider, through a first fader loop on the body strap, through a second slider on the front of the neck strap, through a second fader loop on the body strap, and back through the first slider. When the dog pulls such that the stop strap is not slack, the stop strap tightens against the dog's body when the ends of the stop strap are held by a handler.

7 Claims, 6 Drawing Sheets

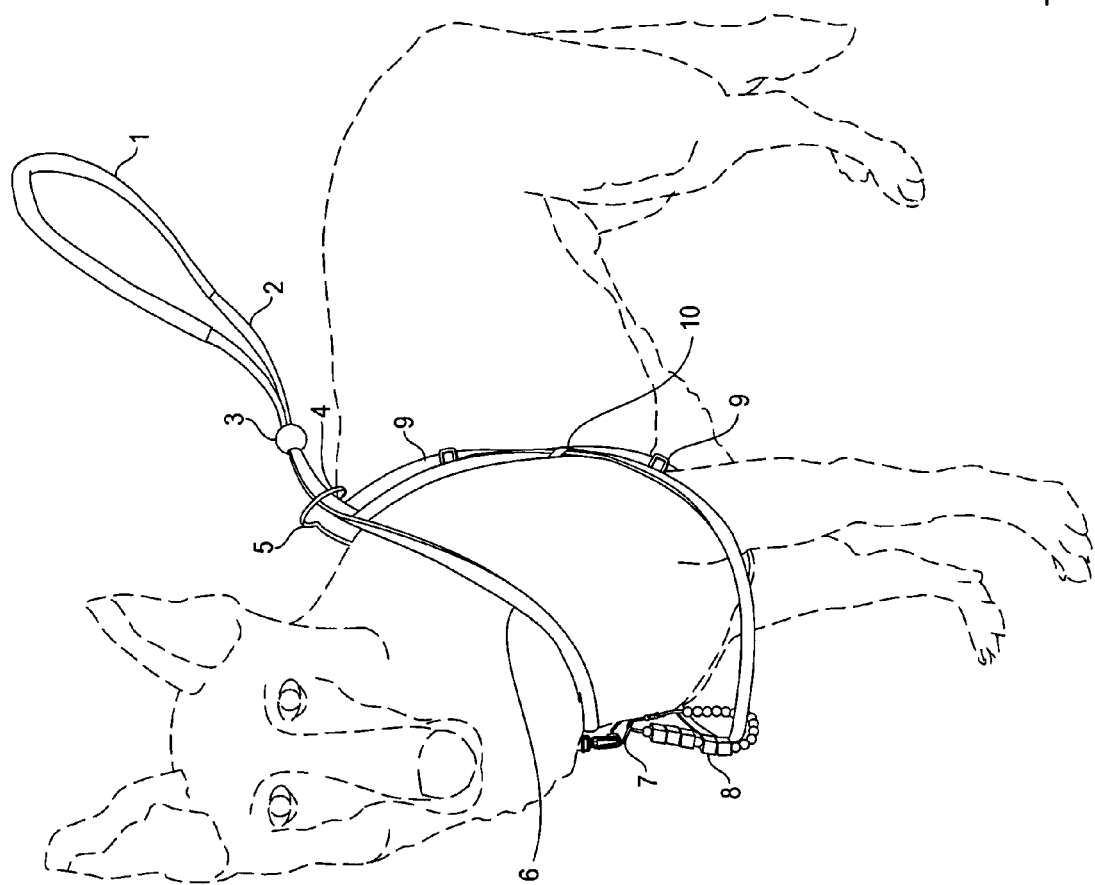
Fig._1

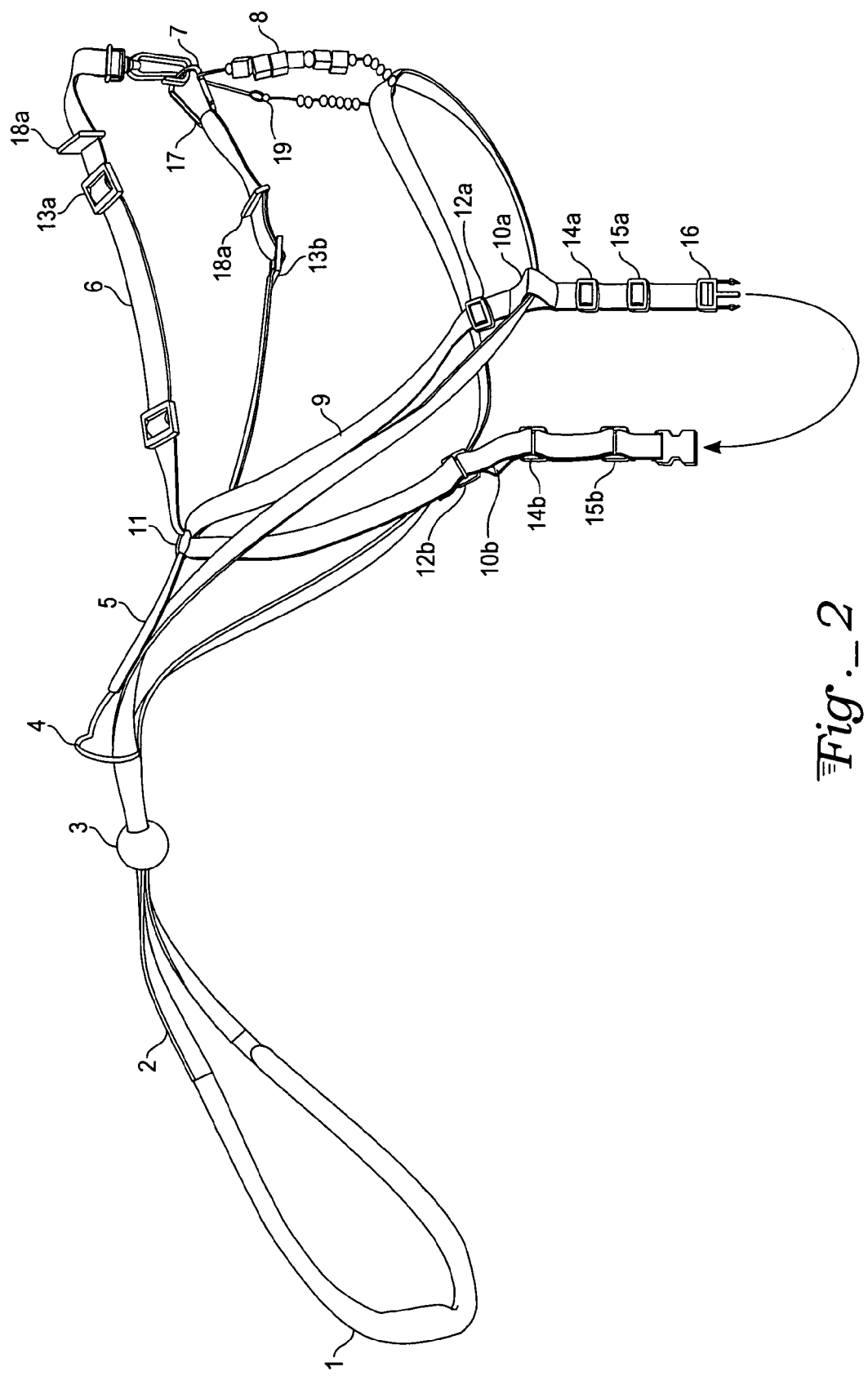
Fig._2

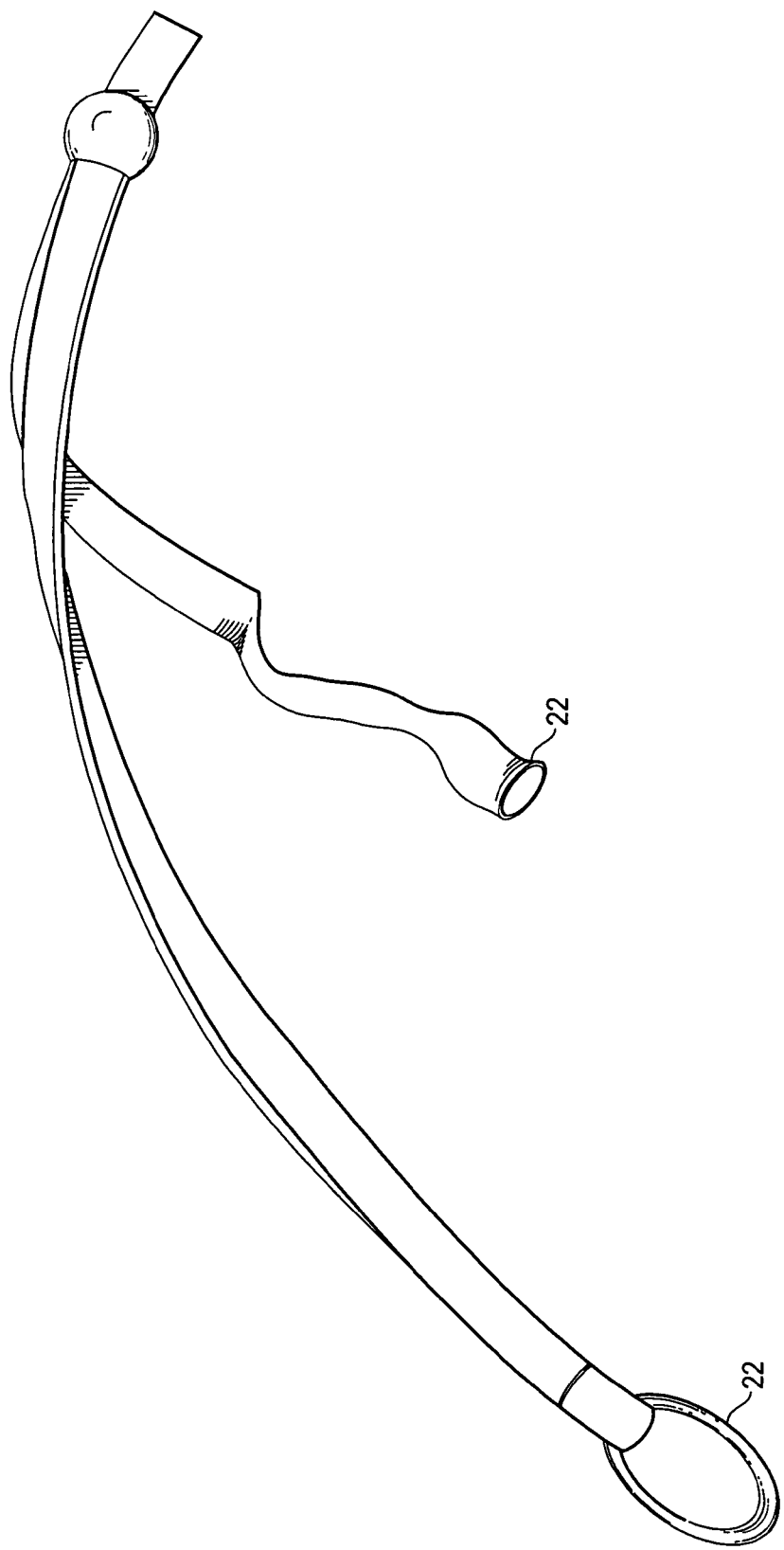
Fig._3

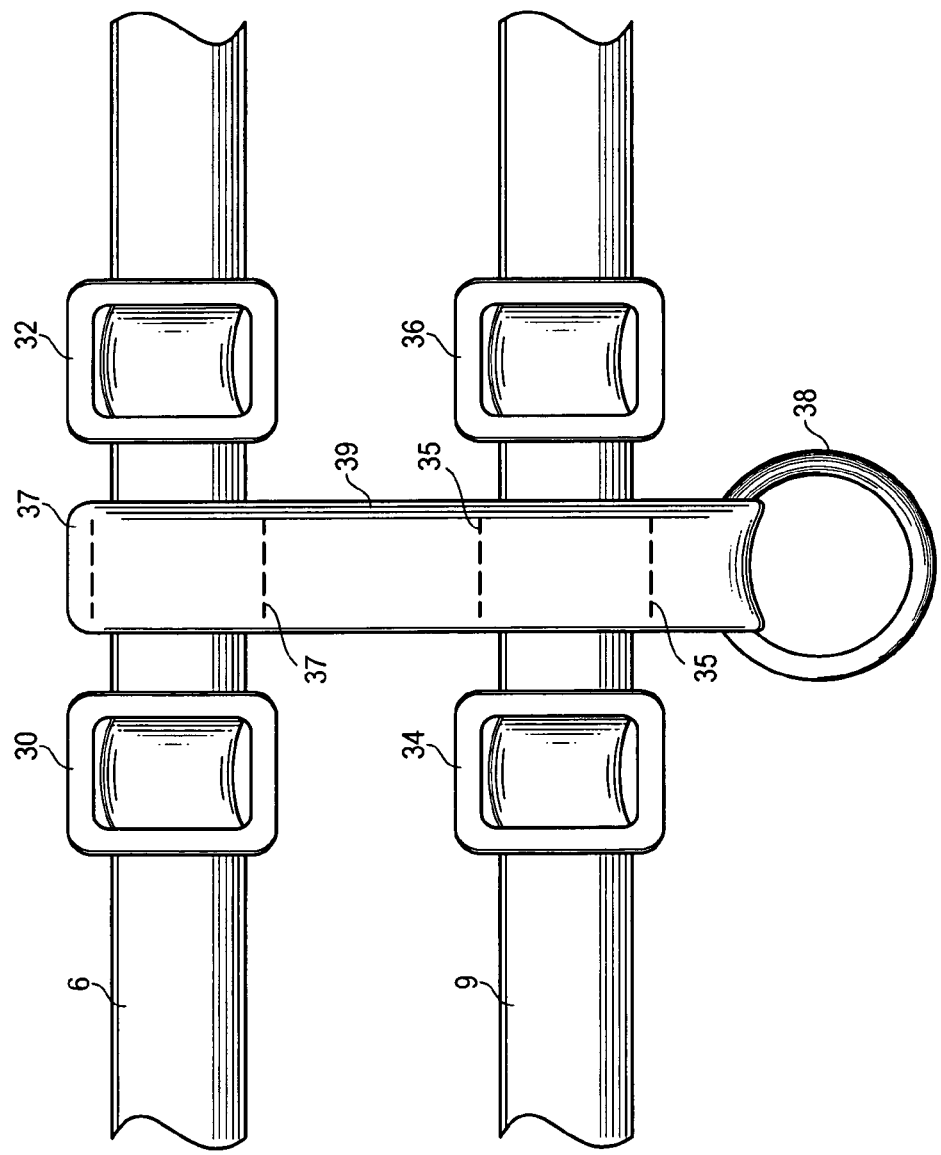

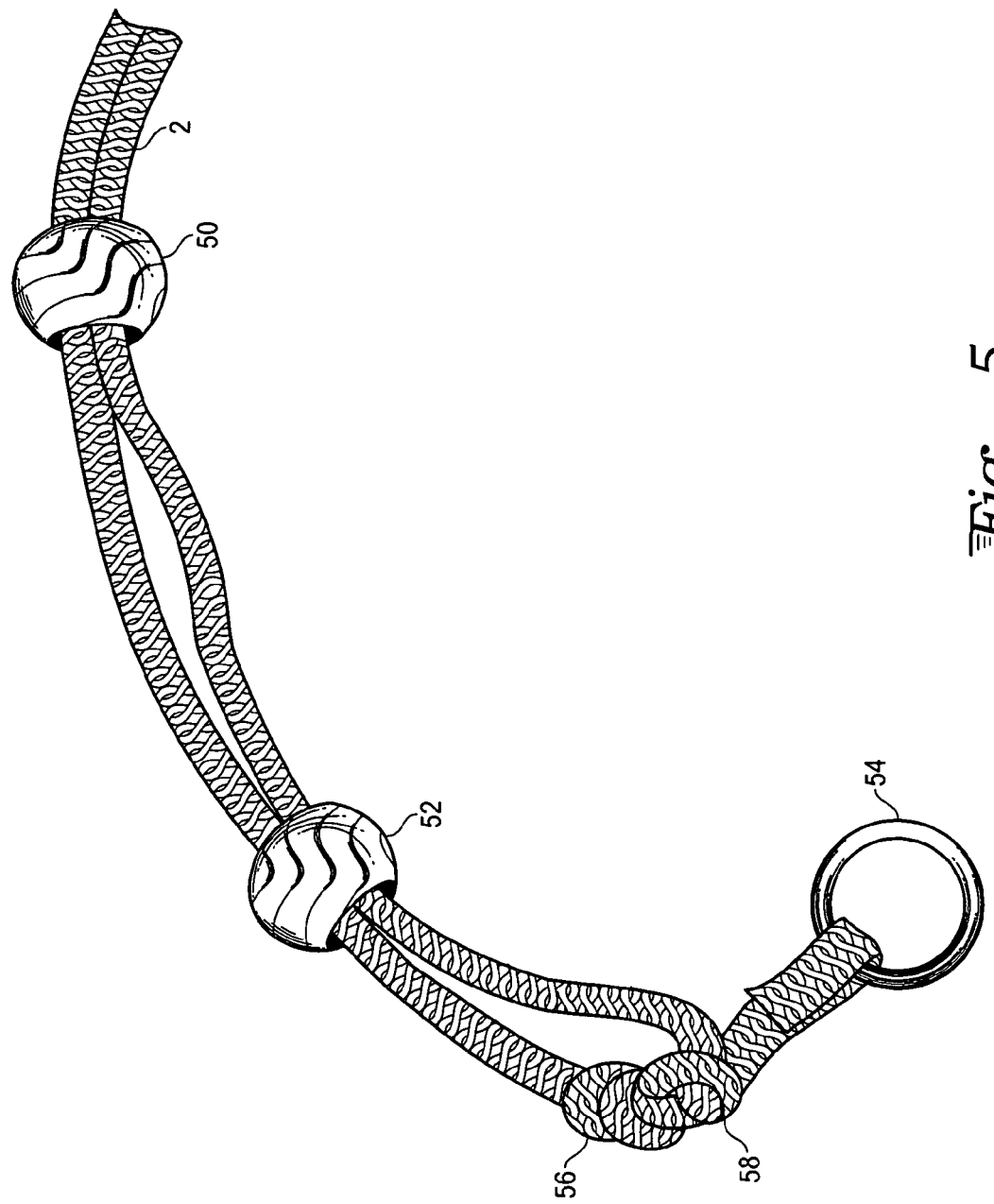

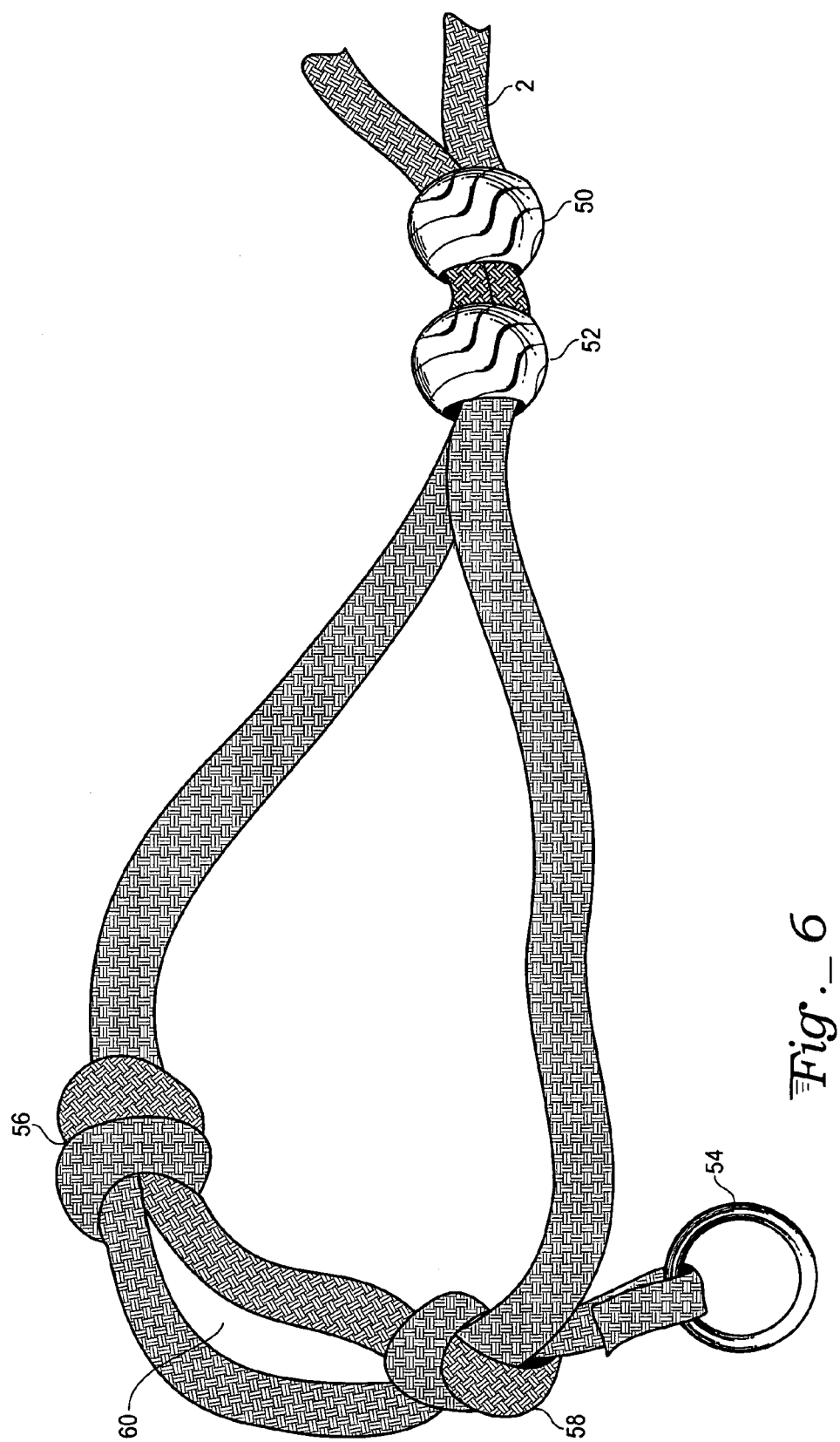
Fig._6

ANIMAL TRAINING HARNESS

CROSS-REFERENCE TO RELATED APPLICATION

This application claims priority from provisional application No. 60/523,757, filed Nov. 20, 2003.

TECHNICAL FIELD

The present invention relates to animal harnesses and more specifically more harnesses that may be specifically used for training an animal not to pull.

BACKGROUND ART

When walking a dog a user attaches a leash to a collar or harness allowing some control of the animal. However, if the animal becomes excited, such as when the animal sees a cat or a squirrel, it may lunge to the end of the leash. This can cause injury to the human holding the leash and can injure the dog as well. To avoid the leash holder from injuring his or her arm, shoulder, or back and to prevent the dog from injuring itself as well a number different animal training devices have been developed.

One such said device is a choke or pinch collar. Such collars are attached around the dogs neck and are able to shrink in diameter as the animal pulls on the leash. This reduction in diameter of the collar can be either a unrestricted amount or can be restricted in various means to only a limited degree of closure. However, choke and pinch collars are problematic. They can cause damage to a dog's throat, back, or soft tissue. This is especially true if the dog is strong, heavy, and lunges suddenly. In addition the choke and pinch collars are punishment based training devices utilizing pain as a means of shaping animal behavior. To avoid causing pain and possibly making the animal have negative associations with the handler alternative devices are needed. U.S. Pat. Nos. 5,325,819 and 5,383,426 to Krauss disclose a harness consisting of a neck collar worn about an animal's neck and a slidable loop. The loop is attached to the collar at two locations one of which is positioned in front of the dog and one is positioned behind the dog's head. A cord extends through these loops forming two loops. When the device is put on a dog the neck collar is attached after the cord is looped under both of the dog's front legs. The second slidable loop cord may freely move on the two loops at the front and back of the collar. When the slidable loop becomes shorter as a dog pulls on a length attached to the end of the slidable loop, the contracting loops cause constrictive pressure underneath both of the dog's legs. Putting such as device on a dog requires slipping the device around both of the dog's legs and affixing the collar around the dog's neck. In addition there is nothing which restricts the amount to which this collar can constrict, resulting in possible concentrated force on the animals soft tissue if the dog lunges.

A similar device is disclosed in U.S. Pat. No. 4,964,369 to Sporn. This device includes a neck collar having four rings or attachment locations spaced about the circumference of the collar. A length of cord having two ring clips on the end may be attached to the pair of attachment rings at the front of the neck collar device while the middle of the length of cord extends through the two rings on back of the collar. The collar is attached around the dog's neck and the cord is passed around the dog's legs and then clipped to each of the two rings on the collar. When the dog pulls on a leash attached to the cord at the back of the collar the loops extending underneath the dog's legs tighten. Again, there is nothing restricting a jolt-like pressure from being exerted during pulling.

Some of the limitations of the first Sporn patent were addressed in subsequent U.S. Pat. Nos. 5,329,885; 5,359,964; 5,370,083; 5,471,953; 5,611,298; and 5,676,093 also to Sporn. These devices describe a dog harness and leash assembly having a fixed diameter loop extending around the dog's neck and pair of strap lengths clipped to the neck loop near the shoulder joints for the dog's front legs. These pair of strap lengths extend under the dog's front legs and are fed through a sliding means at the back of the neck. The sliding means may include a means to limit the amount which the length of material extending underneath the dog's front legs may shorten.

These described devices all require putting some strap underneath the dog's legs. These straps may chafe or rub against the dog's legs when in use and put some pressure on the ligaments and joints under the dog's legs. Although this may be partially addressed by padding the straps an alternative solution would be preferable. In addition, such devices are difficult to fit to various sizes of dogs. It is an object of the present invention to provide a dog harness that restricts forward motion when a dog pulls on a leash and assist in training so that a dog can learn not to pull on the leash. The harness should be comfortable and not restrictive for the dog to wear unless the dog is pulling. It is a further object to provide a harness which is simple to use and acquires no special skills or coordination to use properly. Such a device should prevent the dog from pulling the handler forward. It is a further object to provide a device which may be used in training a dog not to pull.

SUMMARY OF THE INVENTION

The above objects have been achieved with a device including a neck strap and a body strap which worn about the dog's neck and body irrespectively. The neck strap and body strap may be fastened with a clip or other fastener such that when the device is worn by a dog the neck strap extends around the neck of the dog and the body strap extends about the body of the dog between the front and back legs. The two straps are joined together at a location on the dog's back. Extending from the neck and body straps is an additional strap length which includes a slider, such as a ring. A stop strap extends through this slider and is joined to the front neck strap. The stop strap also passes through a fader loop which may be adjustably positioned on the body strap. When the stop strap is pulled, (e.g., when the dog pulls on the leash) the stop strap slides through a ring at the back of the animal's neck, tightening the stop strap against the chest and upper legs of the dog. The more the dog pulls the more the strap tightens. This is an effective training tool.

BRIEF DESCRIPTION OF THE DRAWINGS

FIG. 1 is a perspective view of a dog wearing a harness of the present invention.

FIG. 2 is a perspective view of the harness of FIG. 1 without a dog.

FIG. 3 is a side perspective of an alternative view of a stop strap ends.

FIG. 4 is a top view of a section of the neck strap, body strap, and a connecting back strap.

FIG. 5 is a top view of the end section of one embodiment of the stop strap.

FIG. 6 is the strap of FIG. 5 with the beads and strap ends repositioned.

BEST MODE FOR CARRYING OUT THE INVENTION

With reference to FIG. 1, a dog 30 is shown wearing a neck strap 6 and body strap 9. Neck strap 6 and body strap 9 each are attachable around the dog's neck and body respectively. As shown in FIG. 1, the neck strap 6 and body strap 9 are connected at a ring 11 that is centered on a dog's back just behind the withers. Although a o-ring is used in this embodiment any of a number of means for joining together the back strap and neck strap may be used. These include clips, buttons, hooks and loop attachment sewing the two straps together or they may be joined to the back strap.

Each strap may have a clip for attaching the strap around the body and the neck of the animal and an adjustment means for adjusting the length of the strap. In this way the strap can accommodate a variety of neck and body sizes. Attached at the back area connecting the neck strap 6 and body strap 9 is a back strap 5 holding ring 4. A stop strap 2 extends through ring 4. Stop strap 2 includes handle 1. A bead 3 brings the two ends of stop strap 2 together. Bead 3 has an internal bore through which stop strap 2 passes. Bead 3 thus may be fractionally retained at a selected location on stop strap 2. At the front of the collar a front loop 8 is attached through a carabeener 7 on neck strap 6. The stop strap 2 extends through front loop 8, fader loop 10, and back ring 4. The bead 3 then has each of the ends of the stop strap 2 brought into a confined passage way through bead 3. This ensures that uniform force is applied when the stop strap is pulled. Preferably the force should be uniform on both sides of the dog's legs. When stop strap 2 is pulled this strap slides through a ring 4. Pressure is applied to the dog's chest and to upper part of a dog's legs on both sides of the dog's body. This force constrains the movement of the while minimizing the possibility of soft tissue injury.

The body strap 9 extends around the dog and positioned behind the withers. It is clipped together preferably underneath the brisket with a body strap buckle. The body strap 9 is adjusted so that the location where the body strap is attached to the neck strap is worn at the top of the back of the dog. The strap should be adjusted so that the fit is snug, but comfortable.

The neck strap 6 is also attached by clip around the dog's neck. The neck strap 6 is similarly adjusted so that the o-ring 11 remains in place just behind the back of the dog. Once the neck strap and body strap are adjusted for correct fit the device can simply be attached to the dog by slipping or clipping on the neck strap and then clipping on the body strap.

With respect to FIG. 2, a view of the device without dog shows each of the fittings on each of the straps. The body strap 9 is a loop which extends about the body of the dog. A buckle 16 may be used to attach the strap about the dog's body. Such a buckle may simply be composed of a pair of flexing members with a flaired tip that may flex inward into a receiving clip. Alternatively, the body strap 9 may simply have a number of belt-like holes and buckle 16 may simply have a belt-like buckle having a pin which would fit into one of these holes to both secure the strap about a dog's body and allow for length adjustment. A length of hook and loop material could also be used for length adjustment. Alternatively, length adjustment may be achieved through one or more sliders such as sliders 15A, 15B. These sliders have a length adjustable strip on each side of the body strap 9.

Fader loops 10A, 10B are secured onto body strap 9. In the illustrated embodiment each of the fader loops 10A, 10B are adjustably slidable using sliders 12A, 14A and 12B, 14B respectively. In this way fader loop 10 may be positioned by the user at a selected location on body strap 9.

Body strap sliders 15A, 15B allow adjustable lengthening of the body strap 9. This allows the body strap to accommodate a variety of different dog diameter sizes. A number of alternative methods of having adjustable length of the body strap are possible. This includes having a standard belt with belt holes and buckles having a length of elastic material or any other length adjustment means. Thus a "Fader Loop" is defined as an adjustable loop positioned on a body strap.

The neck strap 6 may be secured by neck strap buckle 17. The same sort of buckle, clip or other fastener which is used in the body strap 9 may be used with the neck strap 6. As with body strap 9, neck strap 6 may have one or more sliders 13A, 13B which allows the length of the neck strap 6 to be adjusted. Neck strap 6 may also include a clip ring or carabeener 7 which may be positioned at the front of the dog's neck when neck strap 6 is secured around the dog's neck. "Ring" as used herein means any structure that creates a discrete loop or hole at a specific location on a strap and may include circular or oval metal or plastic hoops, carabeeners, rope or fabric loop, or other structures through which a portion of a strap may slidably pass. A clip or carabeener 7 may be used in place of buckle on neck strap 6. Neck strap 6 and body strap 9 are joined at a back location by ring 11. Alternatively, the two straps may simply be sewn together attached by a rivot or other means. The straps may simply be threaded through ring 11. Alternatively the straps may be sewn onto ring 11 attached to the back strap or attached in another manner.

FIG. 4 shows an alternative attachment means for linking the neck strap, body strap, and back strap. Neck strap 6 is fed through positioning buckles 30, 32. In a similar manner, body strap 9 is fed through positioning buckles 34, 36. The back strap 39 is looped around neck strap C and body strap 9, and may be secured by stitching 37, 35. Buckles 30, 32 keep the neck strap in place. Buckles 34, 36 keep the body strap in place on the back strap 39. The stop strap is then fed through ring 38.

Attached to neck strap 6 and body strap 9 is stop strap 2. Neck strap 6 and body strap 9 are not sliding straps. Instead, neck strap 6 and body strap 9 are fix length strap. "Nonsliding" strap means although the straps may be manually adjusted by a user, when attached to a dog the straps remain at essentially the same circumferential length. The nonsliding straps do not have a means which during ordinary use would substantially contract the strap against the dog. In contrast sliding strap 2 does contract against parts of the dog when pulled. The strap length passes through ring 4 attached to back strap 5 which is joined to ring 11. The sliding strap next passes through a first location adjustable fader loop 10A, through loop 8 attached to carabeener 7, onto the other side of body strap 9 where the strap again passes through a fader loop 10B, and finally back through ring 4. The two ends of stop strap 2 may then be connected by a handle 1. One or more adjustable beads 3 or other joining devices may be used to bring the two ends of the stop strap together and adjust the size of the stop strap loop that passes around the dog. Depending on the size and proportions of the dog, loop 8 connecting the stop strap to the collar may not be required. Instead the stop strap could be directly connected to carabeener 7 or other hardware attached to the neck strap.

The stop strap 2 may be made of a flexible material that has some rigidity and shape retention. Boning, spring steel, lariat rope, tech rope, or plastic coated cable may be used as suitable materials. Such materials may be fed through a interior area of a durable woven material such as nylon strapping.

The ends of stop strap 2 may be joined by handle 1 as shown in FIG. 2. Alternatively as shown in FIG. 3, the ends may include an end ring 22 or end loop 21, or both. These loops or rings may subsequently be fitted with hardware for a leash attachment.

With reference to FIGS. 5 and 6, various embodiments of the end strap are shown having an adjustable attachment. In FIG. 5, stop strap 2 has both ends pass through beads 50, 52. These beads may be slid apart, as shown in FIG. 5, creating a grip loop. Knots 58, 56 joins the stop strap ends. One end terminates in ring 54, allowing a leash to be clipped onto the strap. In FIG. 6, beads 50, 52 are shown moved closer together. Knot 58 is a slip knot, with one end of the stop strap passing through this knot to knot 56. The length of strap between the two knots may be adjusted, creating gap 60, which may be used as a handle.

When the stop strap 2 is fed through the fader loops 10A, 10B on each side of the dog body strap 9 and the front loop 8 in front or the dog, the stop strap then hangs such that it is positioned below the dog's neck at the top of the chest across the upper part of the dog's legs. The stop strap is slidable at the back ring 11. When pulled, the stop strap contrasts against the dog's body.

The location of the fader loops 10 is adjustable by sliding sliders 12A, 12B and 14A, 14B. This allows adjustment in the location upon which the stop strap will tighten. In general, the lower the stop strap 2, the more effective the restraint. However, the stop strap 2 must be fitted so that when it is tightens across the dog's chest it is above the radial nerve located at the front of the elbow joint. The adjustable bead 3 can be moved down stop strap 2 to make the stop strap 2 smaller or larger depending on the anatomy of the dog. The stop strap 2 is fitted so that it is tight enough such that even when loose it does not allow the dog to step out of the strap. In addition, the stop strap should be loose enough to allow the dog to move its legs freely unless the dog is pulling.

In some instances the neck strap 6 and body strap 9 will be attached together through a connecting strap that attaches to the neck strap and the body strap under the dog's body. However, this is optional.

When properly used the present intention should allow much greater control of the dog. This will both protect the dog, it will not be injured either by rapid jerking of the leash or injured by walking into a dangerous situation which an owner cannot control. In addition it will protect the human handler from having the handler's arms jerked violently by strenuous dog pulling. The present harness is able to modify the behavior of even canines that have strong inclinations to pull.

When the harness is correctly worn by the dog and the dog is not pulling, the stop strap 2 is not restraining the dog's movement and may be away from the dog. This is illustrated in FIG. 1. If the dog suddenly lunges ahead to pull the stop strap 2 will tighten and contact the front of the dog's chest and the upper part of the front legs. This provides a sensation similar to the dog running into a object such as a low clipped bush. In test uses the dogs have immediately stopped when pulling. The harness can also be used as a training tool. If the handler wishes to maintain the current level of management the fader loop 10 and stop strap 2 through fader loop 10 can remain in the position that allows the dog's front legs to move freely unless pulling. In this position the stop strap also effectively and faithfully stops the dog from pulling if the dog does pull.

When used as a training tool, the fader loops may be adjusted. For example, the fader loops can be repositioned using associated sliders onto which the fader loop is mounted to locate fader loops 10 higher on both sides of body loop 9. The location of the fader loops may be adjusted to a highest position in which the sliders are close to ring 11.

The present embodiments are examples of how the present invention may be put into practice. The straps are made of woven nylon, which is inexpensive and comfortable for the dog to wear. Other woven fabrics or leather could be used. To adjust the length of the neck and body strap and to secure these straps, a number of alternatives are known in the art. The back strap and front loop may or may not be included, depending on the dimensions of the dog. The sliding ring could be substituted for any other device which allows the stop strap to freely slide. The neck strap and body strap may include a number of features, such as an elastic section to allow some expansion. The stop strap may include a means to join both sides of the stop strap together and adjust the size (length of the stop strap loop that passes around the dog). This may be a bead, rope clamp, velco, leather ring or other device that serves the purpose of joining and adjustment. The stop strap may also include a means to restrict the amount which the strap can slide. In a simple form this could be a button or other similar device affixed to the stop strap at a location which limits the amount the stop strap can move through a ring by physically stopping the movement through the ring. The straps could be padded for added comfort if desired.

What is claimed is:

1. A dog harness comprising
a non-sliding neck strap;
a non-sliding body strap joined at a first location on said body strap to said neck strap;
a first ring positioned proximate to said first location;
a second ring positioned on said neck strap substantially opposite said first location;
two fader loops on said non-sliding body strap; and
a sliding stop strap having a first and a second end, wherein said stop strap extends through said first ring, through a first fader loop, through said second ring, through said second fader loop and again through said first ring, wherein when worn by a dog the sliding stop strap presses against body parts of the dog when said first and second ends of said stop strap are held by a user and said dog is pulling to a sufficient extent that said stop strap is not slack.

2. The dog harness of claim 1, wherein said neck strap is adjustable.

3. The dog harness of claim 1, wherein said neck strap includes a fastener.

4. The dog harness of claim 1, wherein said body strap is adjustable.

5. The dog harness of claim 1, wherein said boy strap includes a fastener.

6. The dog harness of claim 1, wherein said stop strap is stiffer than said neck and body straps.

7. The dog harness of claim 1, wherein said fader loops are adjustably positionable on said body strap.

* * * * *